Sept. 21, 1971

J. E. FUZZELL 3,606,957

REMOTE CONTROL SYSTEM FOR LOAD MANIPULATING VEHICLES

Filed May 7, 1969

INVENTOR
JOE E. FUZZELL

BY

ATTORNEYS

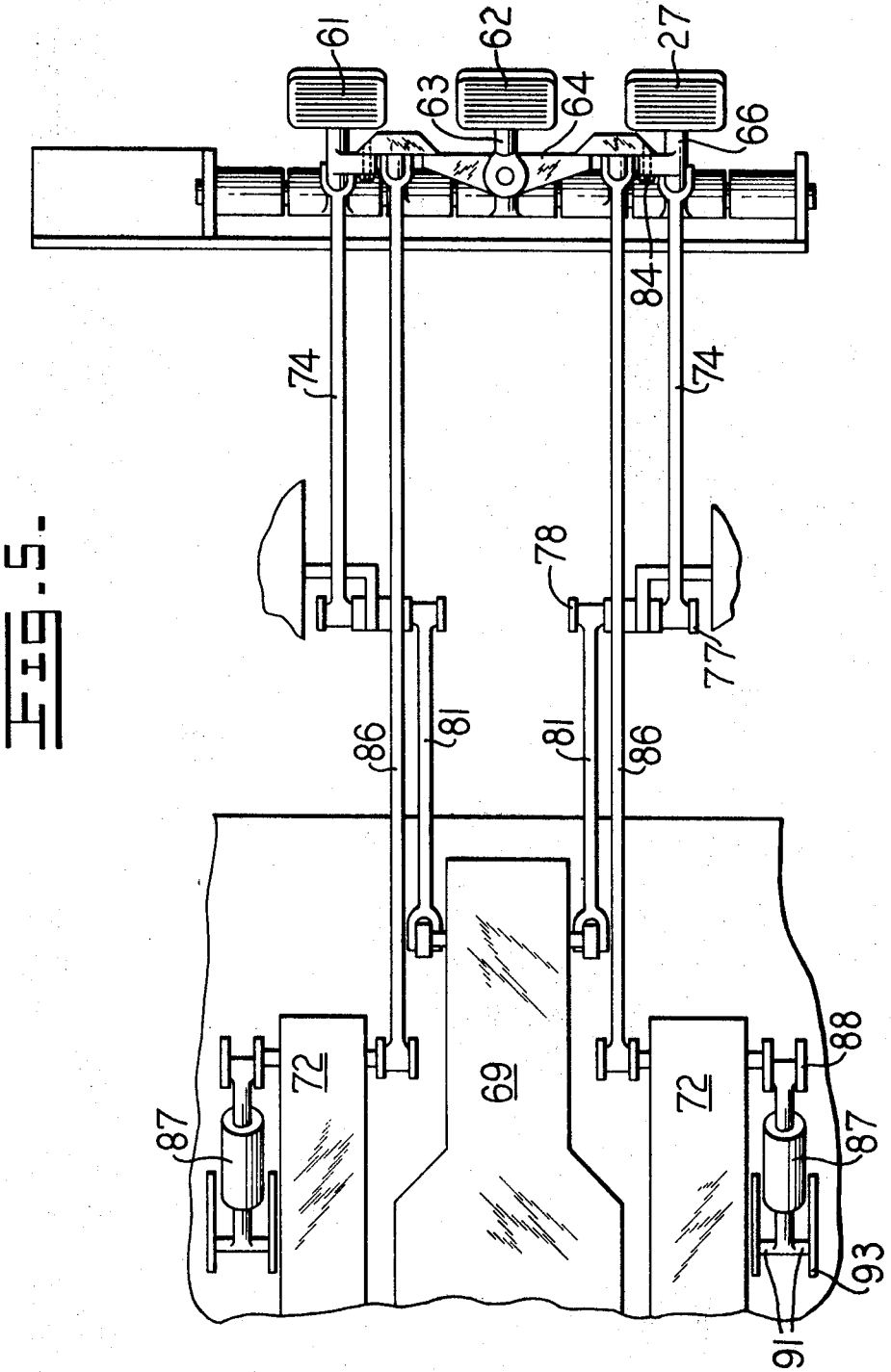

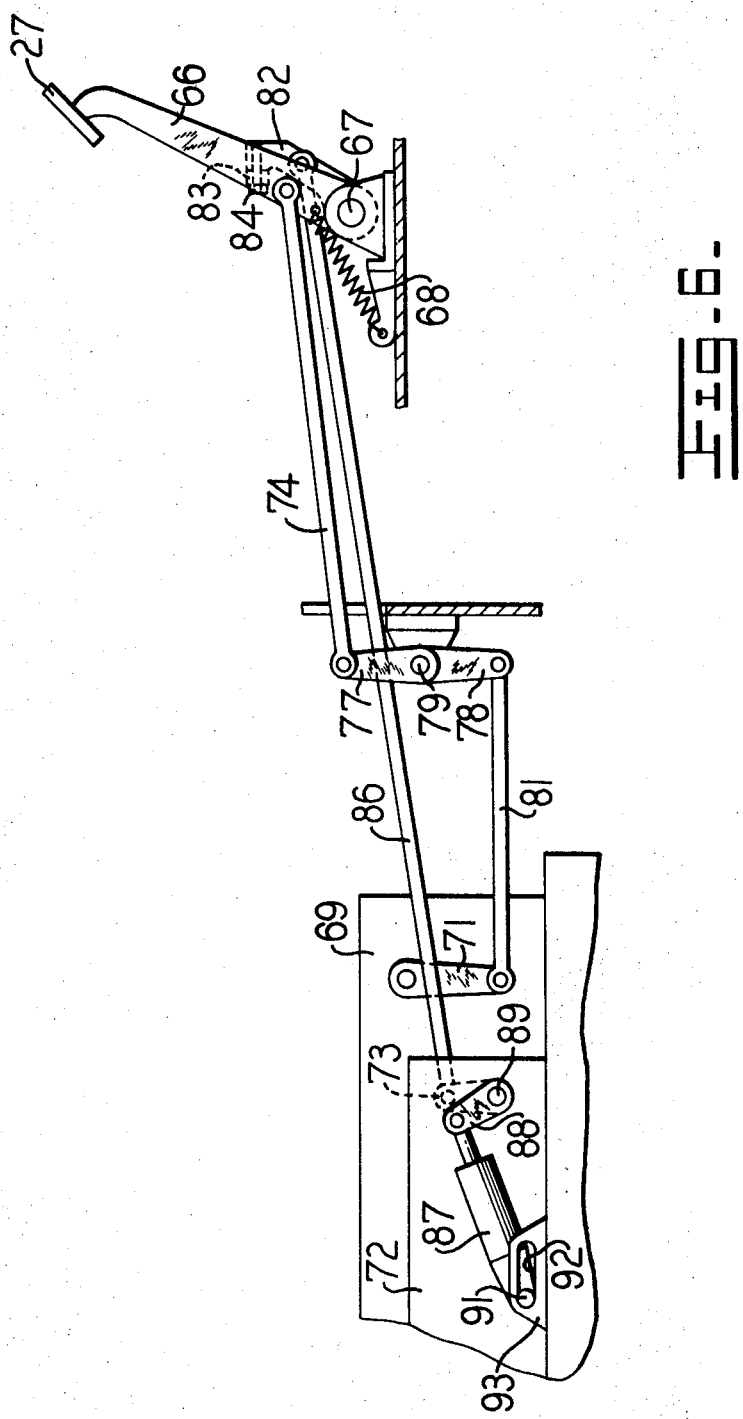

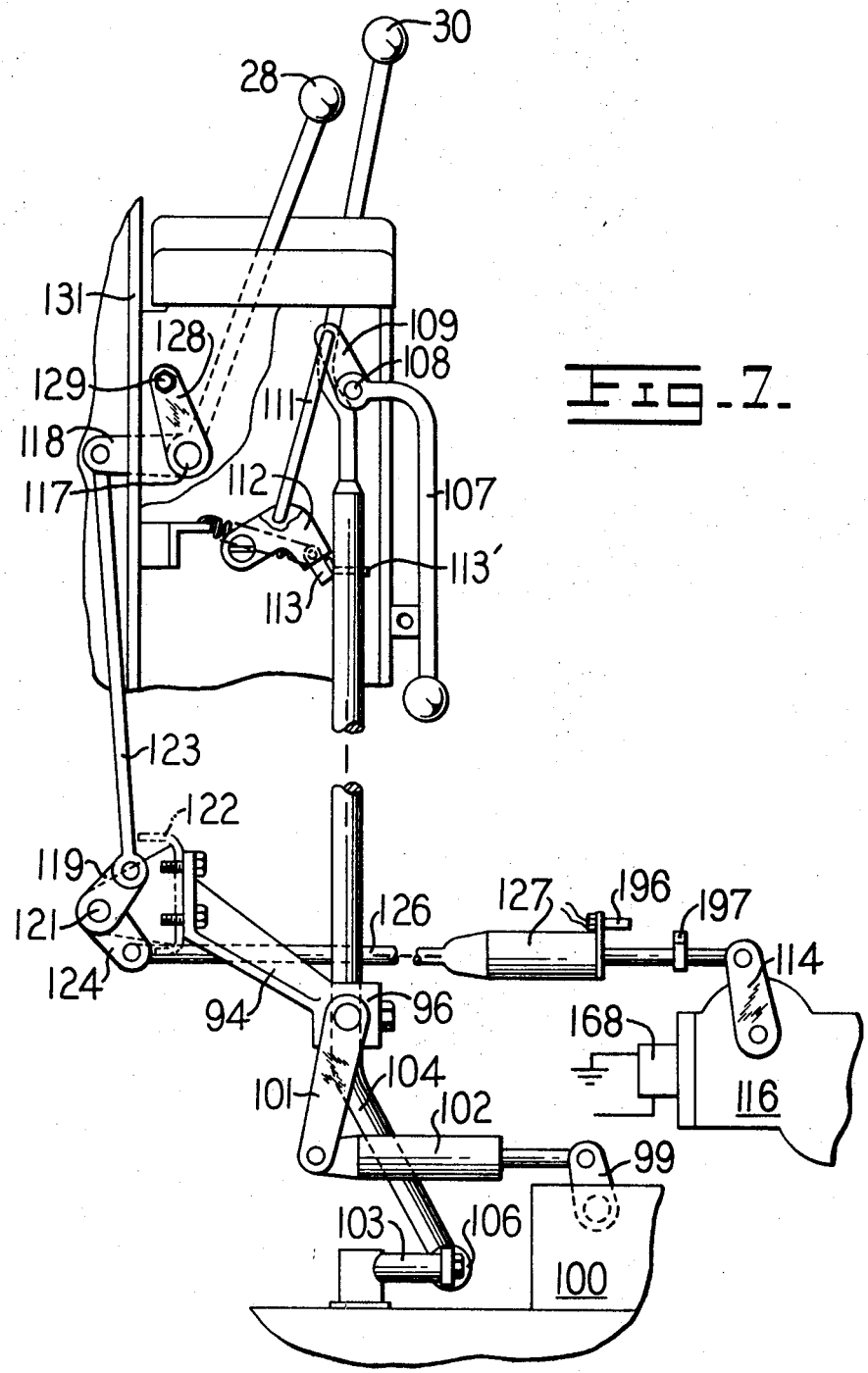

INVENTOR
JOE E. FUZZELL

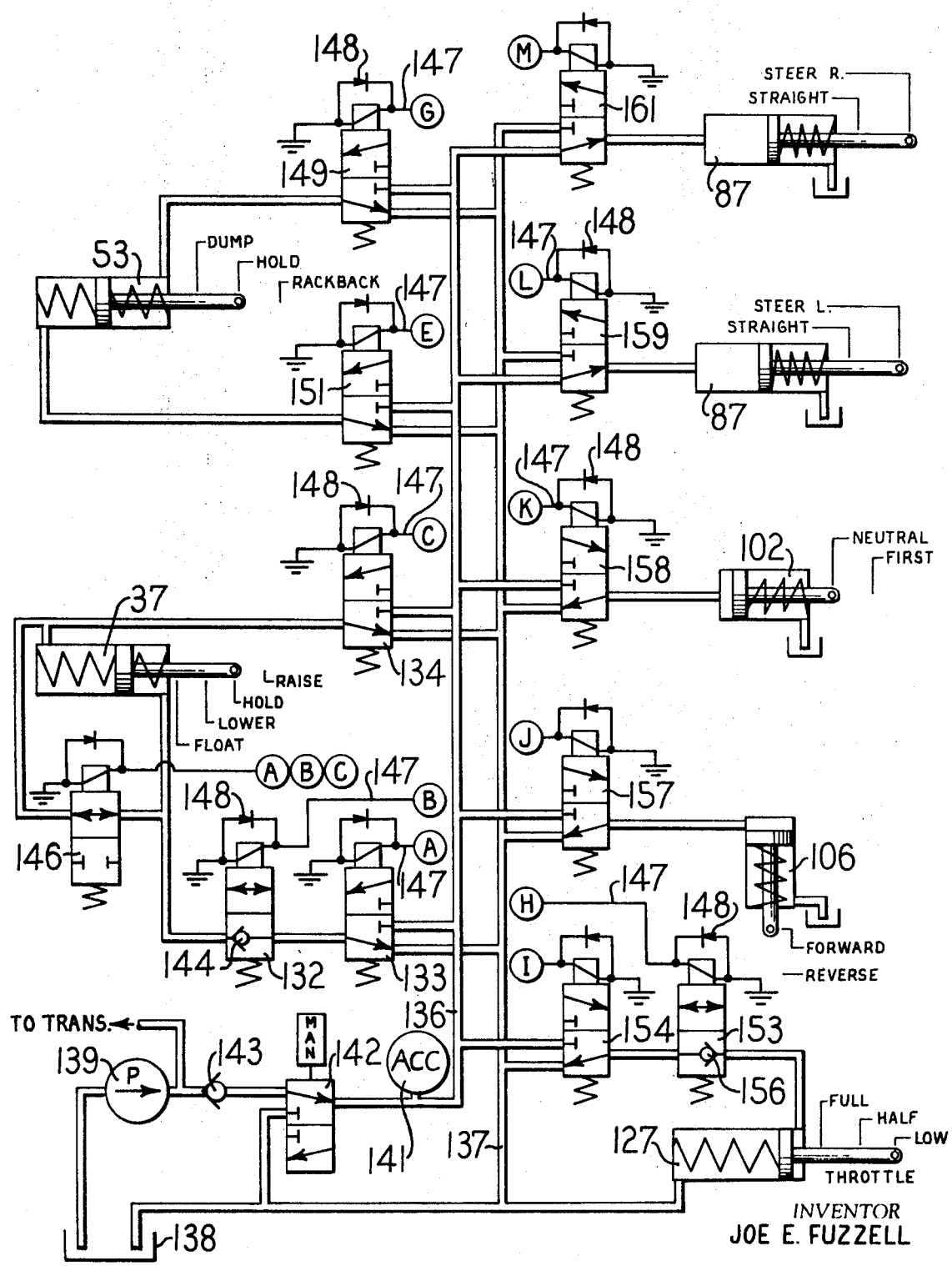

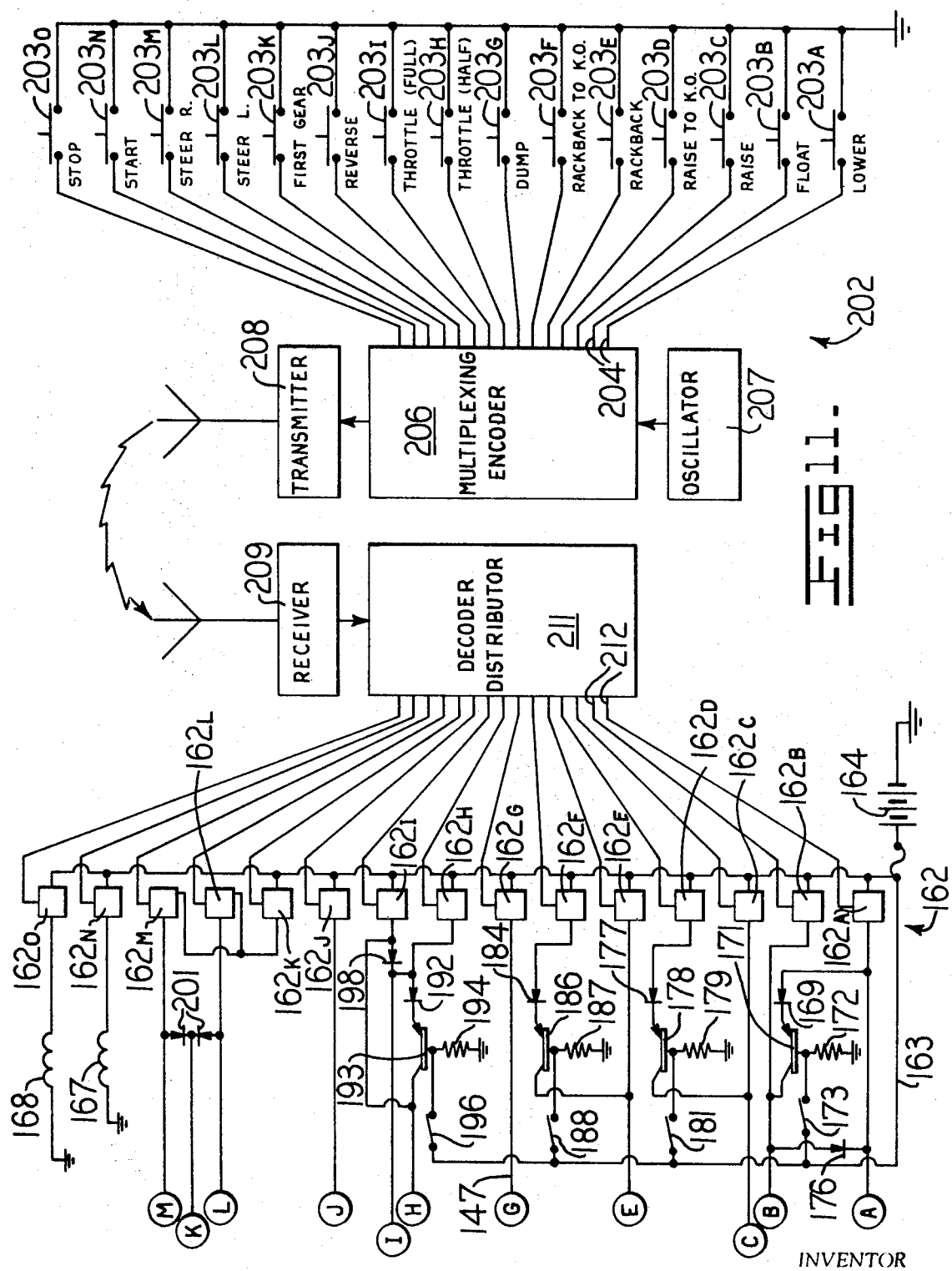

United States Patent Office 3,606,957
Patented Sept. 21, 1971

3,606,957
REMOTE CONTROL SYSTEM FOR LOAD
MANIPULATING VEHICLES
Joe E. Fuzzell, Peoria, Ill., assignor to Caterpillar
Tractor Co., Peoria, Ill.
Filed May 7, 1969, Ser. No. 822,368
Int. Cl. E02f 3/00
U.S. Cl. 214—776    7 Claims

ABSTRACT OF THE DISCLOSURE

A crawler loader vehicle has remote control means capable of effecting intermediate settings of the operator's control linkages as well as extreme positions and provides for remotely initiating movement of the lift arms and bucket with automatic stopping at the intermediate position if desired. Hydraulic jacks, actuatable through radio controlled solenoid valves, are substituted for existing links in control lever linkages. The jacks perform as a conventional rigid link when the operator is situated on the vehicle and provide for the remote control if the operator's control levers are locked in fixed position.

BACKGROUND OF THE INVENTION

This invention relates to powered vehicles and more particularly to systems for controlling the vehicle from a remote location.

Various situations require that the operator of a vehicle be situated at a distance therefrom. A typical circumstance of this kind occurs in steel mills where a loader vehicle is used to handle slag in close proximity to a furnace. While the loader can operate in such an area, the temperatures may be discomforting or intolerable to an operator. Many other circumstances occur where remote control of a vehicle is desirable or imperative.

While systems have heretofore been devised for remotely controlling a variety of different kinds of vehicle, these systems have variously been undesirably complex, incompatible with conventional control by an operator on the vehicle or have not provided for intermediate settings of the controls. In the absence of elaborate servo systems, controls such as the throttle, for example, have been movable only to one of two position. In remote controlled vehicles such as the loader described above, which have powered movable elements additional to those concerned with driving the vehicle, it has not been possible to provide for automatic stopping of the movable load manipulating elements at positions intermediate between the extreme positions of the element. Kickouts or the like for automatically stopping the movement of the lift arms and bucket of a loader at predetermined intermediate positions are a common feature of loaders controlled by an operator on the vehicle but have not heretofore been compatible with remote control systems.

In those instances where prior remote controls operate by manipulating existing operator's control levers, it has been customary to connect fluid or electric motors to the existing control linkages to duplicate the control lever movements which would be made by an operator on the vehicle. These additional elements are useful only for remote control and have no function when the vehicle is controlled by an operator thereon. Such additional elements add considerably to the bulk, complexity and cost of the control linkages and have the very undesirable effect of altering the feel of the controls when they are manipulated in the normal manner by an operator situated on the vehicle.

SUMMARY OF THE INVENTION

This invention provides a simple reliable system for controlling a vehicle from a remote location by means of radio signals or the like in which the several disadvantages of prior systems are overcome. The invention provides for effecting intermediate settings of selected control linkages from a remote location without necessitating highly complicated mechanism and circuitry. The invention further provides for remotely initiating full movement of vehicle components or for alternately initiating a partial automatically stopped movement of the same element.

In a preferred form, the invention avoids adding cumbersome mechanism to existing control lever linkages to effect remote control by simply substituting a fluid operated jack for one of the conventional rigid links in the control lever linkages. With the jacks inactivated, the control lever linkages function in the usual manner to provide for vehicle control by an operator situated thereon. By locking the several control levers in a fixed position and then actuating the jacks through radio control or the like, remote operation is realized.

Accordingly, it is an object of the invention to remotely control a vehicle without requiring very costly and cumbersome structural complications thereof and with a system which is compatible with optional control of the vehicle in the conventional manner by an operator situated thereon. It is a further object of the invention to provide a simple remote control system for a vehicle capable of effecting intermediate settings of the control elements thereof and providing for automatic positioning of movable load manipulating elements thereof at positions intermediate between the extreme positions of such elements.

The invention, together with further objects and advantages thereof, will best be understood by reference to the following description of a preferred embodiment and by reference to the accompanying drawings in conjunction therewith.

BRIEF DESCRIPTION OF THE DRAWINGS

In the accompanying drawings:

FIG. 5 is a plan view of the control linkage for steering and braking the vehicle of FIG. 1;

FIG. 6 is an elevation view of the steering and braking control linkage shown in FIG. 5;

FIG. 7 is an elevation view of the throttle and the transmission control linkages of the loader of FIG. 1;

FIG. 10 is a schematic diagram of hydraulic circuit components of the remote control system, and FIG. 11 is a schematic diagram of electric circuitry of the remote control system.

DESCRIPTION OF A PREFERRED EMBODIMENT

Figure 1:
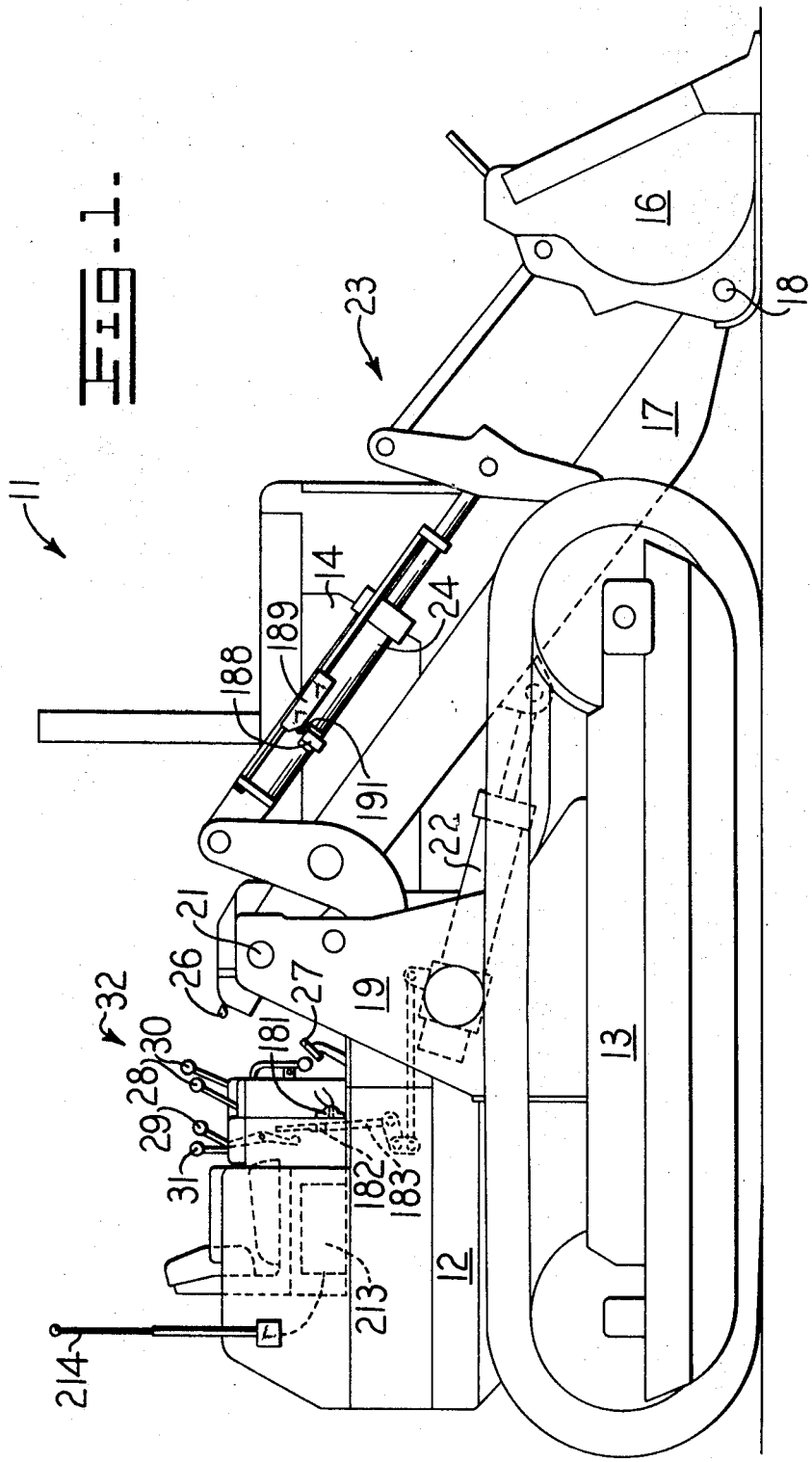
FIG. 1 is a side elevation view, broken out in part, illustrating a track type loader adapted for control from a remote location in accordance with the invention.

Referring now to the drawings and more particularly to FIG. 1 thereof, for purposes of example the invention will be herein described with reference to a track type loader 11, it being understood that the invention is also adaptable to diverse other types of vehicle.

Salient elements of a loader 11 are a body 12 riding on a pair of endless track mechanisms 13 and carrying a forwardly mounted engine 14 for driving the tracks and the various load manipulating components of the vehicle. The principal load manipulating components in this form of vehicle include a bucket 16 attached to the forward ends of lift arms 17 at a pivot joint 18. The lift arms are coupled to loader towers 19 attached to body 12 at pivot joints 21 situated above the central region of the vehicle. To raise and lower the lift arms 17, hydraulic lift jacks 22 are connected between the arms and loader towers 19. Tilt linkage 23 is coupled to bucket 16, lift arm 17 and towers 19 in the conventional manner to maintain the bucket at a constant inclination relative to the ground as lift arms are raised or lowered. The tilt linkage 23 includes hydraulic tilt jacks 24 for selectively pivoting the bucket 16 relative to lift arms 17.

The major elements of the loader 11 as briefly reviewed above may be of conventional construction, suitable detailed structure therefor being well known in the art.

In keeping with an important object of the invention, the loader 11 is provided with a set of controls enabling operation of the vehicle in the conventional manner by an operator who rides on the vehicle. Such controls include a key operated start and stop switch 26, foot pedals 27 for steering the vehicle, a throttle lever 28 for varying engine speed, transmission shift lever 30, and lift and tilt jack control levers 29 and 31 respectively. The portions of the several controls which are grasped or otherwise manipulated by the operator are conventionally situated at an operator's station 32 to the rear of engine 14. Each of the above described controls may be operatively coupled to the vehicle component which it controls in the usual manner except as hereinafter described.

Figure 2:
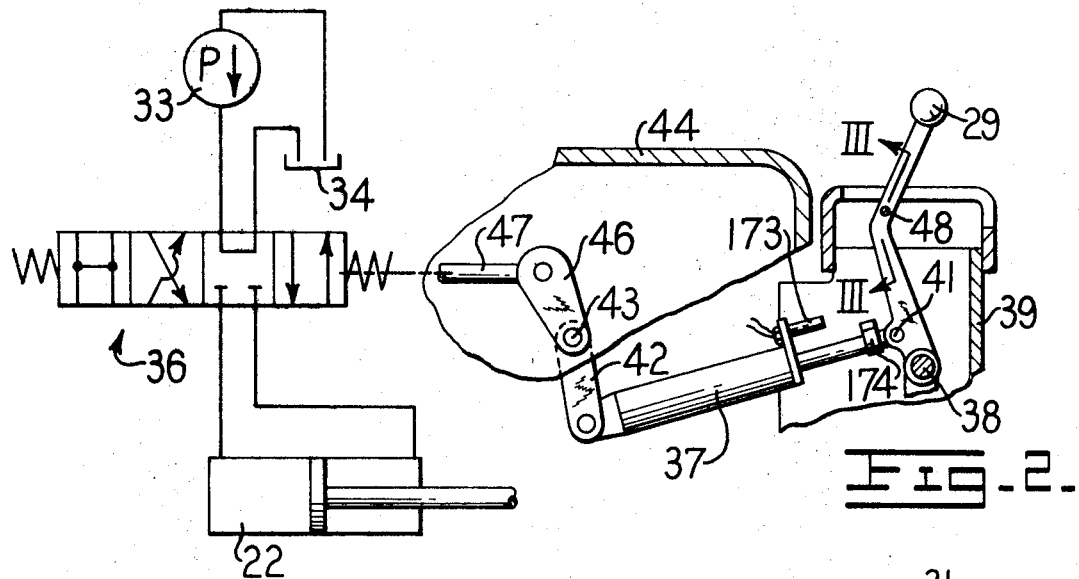
FIG. 2 is a view, partially in section, of the operator's control linkage associated with the lift arms of the loader of FIG. 1 with certain elements being shown schematically.

Considering now the provisions for optional control of the vehicle from a remote location, FIG. 2 illustrates the operator's lift control lever 29 and a portion of the control linkage which coacts therewith, the lift jacks 22 and hydraulic circuit elements associated therewith being shown schematically. Lift jacks 22 are operated by hydraulic fluid from a source such as a pump 33 which draws fluid from a suitable reservoir 34, the pump being connected to the lift jack through a four position spool valve 36. Valve 36 has one position at which the head end of jack 22 is connected to the pump 33 while the rod end of the jack is connected to reservoir 34, a second position at which the ports at both the rod end and head end of the jack are closed while the pump output is returned to reservoir 34, a third position at which the pump output is communicated to the rod end of the jack while the head end of the jack is communicated with the reservoir and a fourth position at which the rod and head ends of the jack are communicated with each other and with both the output of the pump and reservoir. These four positions correspond respectively to the Lift, Hold, Lower and Float settings of the operator's control lever 29, the spool valve 36 being spring biased to the Hold position. The lift cylinder control system may, if desired, be provided with detent and kickout mechanism for use when the loader is controlled by an operator situated on the vehicle, a suitable example of such mechanism being described in U.S. Pat. 3,358,860.

The mechanical linkage which connects operator's control lever 29 with spool valve 36 may be identical to existing control linkages for that purpose as described, for example, in the above mentioned U.S. Pat. 3,358,860, except that a small hydraulic jack 37 is substituted for one of the rigid links in the prior control linkage. Thus, control lever 29 is pivoted near its lower end at pin 38 to stationary housing 39 and the upper end portion protrudes therefrom in position to be grasped by the operator. A pivot 41 situated a small distance above the pivot 38 couples the rod of jack 37 to control lever 29 and the head end of the jack is pivoted to a crankarm 42 which turns about an axle 43 journalled in a second stationary housing 44. A second crankarm 46 is secured to axle 43 with the distal end being pivoted to a long link 47 which pilots the spool valve 36. Thus, when an operator is situated on the vehicle, pivoting of the control lever 29 acts to shift the spool valve 36 in the conventional manner for the purpose of actuating and deactuating the lift cylinder 22. As long as the jack 37, which forms a part of the control linkage, is not actuated, it functions essentially in the manner of the rigid link which it replaces.

Figure 3:
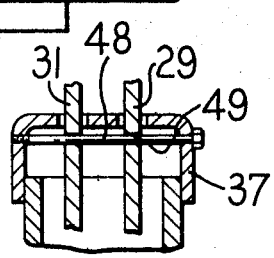
FIG. 3 is a partial section view of the linkage of FIG. 2 taken along line III—III thereof.

However, when the vehicle is to be operated from a remote location as will hereinafter be discussed in more detail, the operator's control lever 29 is immobilized. As shown in FIG. 3 in conjunction with FIG. 2, this may be accomplished, for example, by transpiercing a bolt 48 through stationary housing 39 and a passage 49 in the control lever 29. In this particular example of the invention, a single bolt 48 may be utilized to immobilize both the lift control lever 29 and tilt control lever 31.

Referring now again to FIG. 2 in particular, it may be seen that with the control lever 29 locked in one position, extension and retraction of the hydraulic jack 37 will operate the associated linkage comprised of crankarms 42 and 46 and link 47 to pilot the lift cylinder control valve 36 into any of the several described positions thereof. Electrical and hydraulic circuitry for operating the jack 37 for this purpose will be hereinafter described.

Figure 4:
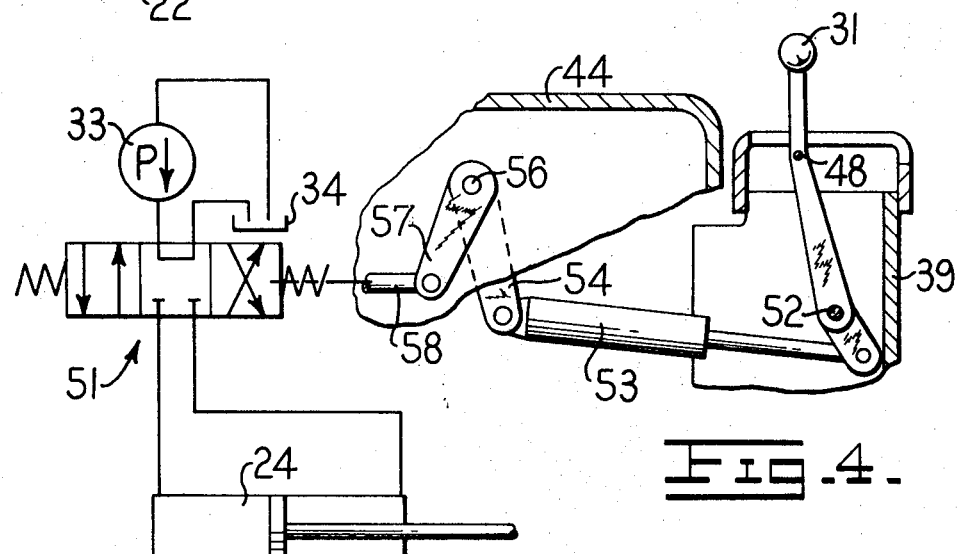
FIG. 4 is a view, partially in section, of the operator's control linkage associated with the bucket tilt mechanism of the motor of FIG. 1 with certain elements of the system being shown schematically.

Essentially similar provisions are made for either local or remote control of the tilt jacks 24. Referring now to FIG. 4, the tilt jacks 24 are selectively communicated with the hydraulic fluid pump 33 and reservoir 34 through another spool valve 51 which in this instance has three positions. At a first or Dump position, spool valve 51 communicates the output of pump 33 with the head end of tilt jack 24 while communicating the rod end thereof with reservoir 34 and at a second or Hold position of the spool valve, both the head end and rod end of the tilt jacks are blocked while the output of pump 33 is transmitted directly to reservoir 34. At the third or Rackback setting of the spool valve 51, the output of pump 33 is transmitted to the rod end of tilt jack 24 while the head end thereof communicates with the reservoir 34. Valve 51 is spring biased to the center (Hold) position.

The operator's tilt control lever 31 is pivoted to stationary housing 39 at a pivot 52 situated a small distance above the lower end of the lever and is coupled to the spool valve 51 by control linkage again similar to that of prior loaders except that another small hydraulic jack 53 replaces one of the rigid links of the prior system. The rod end of jack 53 is pivoted to the lower end of tilt control lever 31 while the head end of the jack is pivoted to the distal end of a crankarm 54. Crankarm 54 turns an axle 56 journalled in stationary housing 44 and a second crankarm 57 is secured to the axle to operate a long link 58 that pilots the spool valve 51. Thus, manipulation of the tilt control lever 31 by operator seated on the vehicle controls the bucket tilting jack 24 in the conventional manner and, again, suitable detents and kickout mechanisms may be associated with the controls if desired as shown in U.S. Pat. 3,429,471 for example.

For remote control, the operator's tilt control lever 31 is immobilized by the transverse bolt 48 which has been previously described. Under this condition, extension and retraction of the hydraulic jack 53 as will hereinafter be discussed in more detail, shifts the spool valve 51 for the purpose of dumping or racking back the bucket.

The particular loader vehicle herein described is pedal steered through linkage shown in FIGS. 5 and 6 when an operator is situated on the vehicle. By depressing a right foot pedal 27 the right hand track mechanism is decoupled from the engine drive line and then braked to turn the vehicle to the right and a left hand foot pedal 61 similarly provides for turning to the left. A center pedal 62 is mounted on a lever 63 with arms 64 which overlap both pedals 27 and 61 so that by depressing the center foot pedal, both track mechanisms are decoupled from the engine and are braked in order to brake the vehicle as a whole.

Referring now to FIG. 6, in particular, which shows a side view of the right foot pedal 27 and associated linkage, such pedal is mounted upon a lever 66 which is connected to the body of the vehicle at a pivot joint 67 at the lower end of the lever and a spring 68 is connected between the lever and the vehicle body to urge the lever towards an upward position. Upon being depressed, pedal 27 acts to disengage a steering clutch 69 by pivoting a control crankarm 71 thereof and then acts to apply the brake 72 by pivoting a control crankarm 73 thereof. Linkage for this purpose includes a link 74 pivoted to the lower portion of foot pedal lever 66 which turns a crankarm 77 which in turn pivots a crankarm 78 through an axle 79 with the crankarm 78 being coupled to the clutch control arm 71 by another link 81.

A short auxiliary lever 82 extends generally upward from foot pedal lever pivot 67 in position to be engaged by a tab 83 of the foot pedal lever whereby it is pivoted in conjunction therewith, a bolt 84 being transpierced through the tab to secure the upper end of lever 82 thereto. A single long link 86 connects lever 82 with the actuating arm 73 of brake 72.

The above described linkage between steering foot pedal 27 and clutch 69 and brake 72 is essentially similar to existing loader steering linkages. In order to provide for remote control, a hydraulic jack 87 has a rod end pivotably coupled to a crankarm 88 which is linked to brake actuating arm 73 by an axle 89 for turning in conjunction therewith. The opposite end of jack 87 has laterally projecting pins 91 which extend into slots 92 of fixed brackets 93. As the pins 91 may slide in slots 92, the presence of the jack 87 does not affect normal control of the vehicle by an operator thereon as described above. However, if the jacks 87 are actuated for remote control purposes, the pins 91 seat against the back end of slot 92 and extension of the jack then operates the above described linkage to actuate both the clutch 69 and brake 72.

Figure 9:
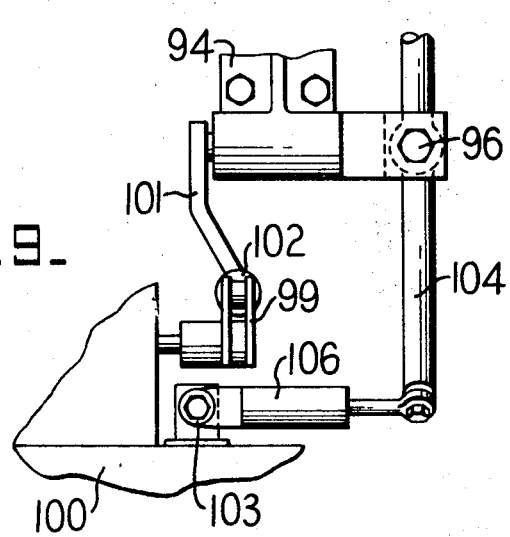
FIG. 9 is a supplementary view of the throttle and transmission control linkages taken along line IX—IX of FIG. 7.
Figure 8:
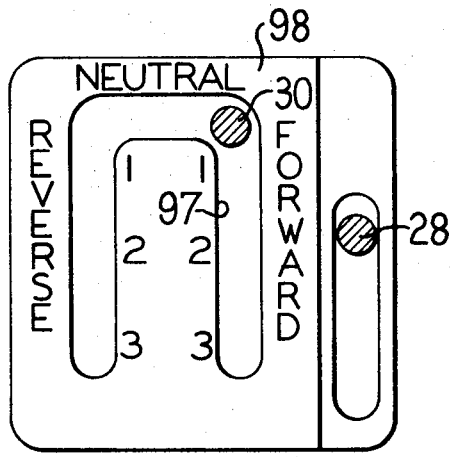
FIG. 8 is a plan view of the shift lever console plate of the linkage of FIG. 7.

Referring now to FIGS. 7 and 8 in conjunction, the operator's transmission shift lever 30 is coupled at the lower end to a fixed bracket 94 by a universal type of joint 96 whereby, as shown in FIG. 8 in particular, the lever may be moved within a U-shaped slot 97 in a console plate 98 between three forward speed positions at one leg of the U and three reverse speeds in the other leg and a neutral position between the two legs. Referring now to FIG. 9 in conjunction with FIG. 7, fore and aft movement of the shift lever 30 is transmitted to the speed range selecting arm 99 of the transmission 100 by a crankarm 101 and a link 102 which connects the lower end of the crankarm with transmission arm 99. To provide for the optional remote control, the link 102 is not a simple rigid link as in the prior similar control linkage, but is a double-acting hydraulic jack.

Sideward movement of the shift control lever 30 between the forward and reverse positions is transmitted to the forward-reverse selector arm 103 of transmission 100 by an extension 104 of control lever 30 which extends downwardly from the universal joint 96 and which is connected with forward-reverse selector arm 103 by a link which in accordance with the invention is an additional hydraulic jack 106.

Thus, if the jacks 102 and 106 are not actuated, the operator on the vehicle may shift the transmission in the normal manner. However, if the shift lever 30 is locked into a fixed position, the transmission may be shifted by selective actuation of the jacks 102 and 106 as will hereinafter be discussed in more detail. To lock the shift lever 30 in a fixed position for this purpose, an existing safety control lever 107 may be utilized. Such a lever is often provided on prior loaders for the purpose of locking the transmission in neutral. Lever 107 is pivoted for movement in a vertical plane about a horizontal axle 108 to which a crankarm 109 is coupled, with the crankarm 109 being connected by a link 111 to a pivoting locking member 112 having a transverse bar 113 which moves into a position at which control lever 30 is held in the neutral position when safety lever 107 is pivoted downwardly about axle 108. A projection 113' of bar 113 holds the shift lever at the forward side of the neutral slot.

Referring now to FIG. 7 in particular, the throttle lever 28 operates a speed selector arm 114 of the engine governor 116. The throttle lever 28 is pivoted at the bottom end at an axle 117 and a crankarm 118 extends therefrom. Another crankarm 119 extends from another axle 121 journalled in a bracket 122 and is coupled to arm 118 by link 123. Still another arm 124 is secured to axle 121 and is connected to speed selector arm 114 of the governor by a link 126 which in accordance with the present invention is defined in part by another hydraulic jack 127. Thus, when the vehicle is controlled by an operator thereon, pivoting of the throttle lever 28 acts to adjust the speed setting of the governor 116 in the conventional manner. However, if the throttle lever 28 is fixed in position, remote control is provided for by extension and contraction of jack 127. To provide for locking of the throttle lever for this purpose, still another arm 128 extends from axle 117 and a bolt 129 is transpierced therethrough and threaded into the adjacent fixed housing structure 131 to hold the throttle lever at the low idle position in this instance.

Thus, the several control linkages of the loader 11 are all of basically known construction except insofar as an existing link has been replaced with a hydraulic jack and means have been provided for fixing the operator's control levers in a predetermined position where such means are not already a component of the vehicle.

In order to operate the several controls described above from a remote location, each of the hydraulic jacks in the several control linkages is selectively actuated through one or more electrically controlled valves, suitable fluid circuitry for this purpose being shown in FIG. 10. The above described lift control linkage jack 37, for example, is controlled by three solenoid valves 132, 133 and 134.

Each of the three solenoid valves 132, 133 and 134 has an input connected to a hydraulic fluid supply line 136 and an outlet coupled to a return or drain line 137 leading to the hydraulic fluid reservoir 138. Supply line 136 is connected to a suitable source of pressurized fluid such as the transmission fluid pump 139 of the loader. Supply line 136 connects with the pump and an accumulator 141, a manually operable drain valve 142 and check valve 143 which blocks reverse flow in the event of pump failure. Drain valve 142 communicates the pump with supply line 136 during remote control operation of the motor and has an alternate setting at which the supply line 136 is coupled to reservoir 138 to drain the supply line when the loader is to be operated in the normal manner by an operator situated thereon.

The lift control linkage actuating jack 37 has four positions which can be achieved by appropriate sequencing of the three control valves 132, 133 and 134, these positions being Raise, Hold, Lower and Float proceeding from the most extended position of the cylinder to the most retracted position thereof. As hereinbefore described, jack 37 is spring biased to the Hold position at which the lift arms of the loader are immobilized. Solenoid valves 132 and 133 are series connected between the rod end of jack 37 and supply line 136 with valve 133 having an unenergized position at which valve 132 is communicated with return line 137 and having an energized position at which valve 132 is connected to supply line 136. Valve 132 has an unenergized position at which the rod end of jack 37 communicates with valve 133 through a check valve passage 144 within valve 132 that limits flow to a direction away from the rod end of the jack. At the energized position of solenoid valve 132, the rod end of the jack is communicated with valve 133. The additional solenoid valve 134 has an unenergized position at which return line 137 is communicated with the head end of jack 37 and an energized position at which supply line 136 is communicated therewith. Accordingly, jack 37 may be extended to the Raise setting by energizing solenoid valve 134 and may be contracted towards either the Lower or Float position by energizing both solenoid valves 132 and 133. As will hereinafter be discussed in connection with the electrical circuitry of the invention, contraction of the jack 37 is terminated before full contraction thereof in order to achieve the Lower setting whereas the jack is fully contracted to effect the Float position.

To enable the jack 37 to be spring returned to the Hold position faster than would otherwise be the case, still another solenoid control valve 146 is connected between the rod and head end of the jack. Valve 146 is normally open to provide for a rapid exchange of fluid between the ends of the jack so that the Hold position is quickly achieved by the spring bias action. Solenoid valve 146 is energized to a closed position, concurrently with energization of any of the solenoid valves 132, 133 or 134 as will hereinafter be discussed.

Each of the above described solenoid valves 132, 133, 134 and 146 has an electrical lead wire 147 connected thereto to receive an energizing signal, the other terminal of each solenoid valve being grounded. A diode 148 is connected between each lead wire 147 and ground to avoid damage from transient voltages.

The tilt control linkage actuating jack 53 is spring biased to the center (Hold) setting as previously described and has only two additional positions, Dump and Rackback corresponding to extreme contraction and extreme extension of the jack respectively. Thus, jack 53 does not need to be positioned at any intermediate setting other than that achieved by the spring bias action and accordingly may be remotely controlled through two additional solenoid valves 149 and 151 connected between the rod and head end respectively of jack 53 and the supply and return lines 136 and 137. Solenoid valve 149 has an unenergized position at which the rod end of jack 53 is communicated to drain line 137 and an energized position at which the rod end of the jack is communicated with supply line 136. Solenoid valve 151 has an unenergized position communicating return line 137 with the head end of jack 53 and has an energized position communicating supply line 136 therewith.

Thus jack 53 may be caused to contract to the Dump position by energizing solenoid valve 149 and may be caused to extend to the Rackback position by energizing solenoid valve 151. For this purpose each solenoid valve 149 and 151 has an electrical signal lead wire 147 with the other terminal being grounded and with the solenoids being again bypassed by protective diodes 148.

Remote control of the throttle setting jack 127 presents a somewhat different control problem. While it has three settings for remote control purposes, specifically Full Throttle, Half Throttle and Low Throttle corresponding to extreme contraction, half extension and extreme extension of the jack respectively, the jack is spring biased to one of the extreme positions and more particularly to the Low Throttle position at which the jack is fully extended. Accordingly, the head end of the jack is communicated directly with return line 137, since the full extensive movement of the jack is provided for by the spring biasing. The rod end of jack 127 is connected to supply line 136 and return line 137 through a pair of series connected solenoid valves 153 and 154. The solenoid valve 153 closest to jack 127 has an unenergized position at which the rod end of jack 127 is communicated with solenoid valve 154 through check valve mechanism 156 within valve 153 that limits flow to a direction away from the jack. At the energized position, solenoid valve 153 communicates the rod end of the jack with valve 154. Valve 154 in turn has an unenergized position at which valve 153 is communicated with return line 137 and has an energized position at which valve 153 is communicated with supply line 136. Thus, if both solenoid valves 153 and 154 are energized, jack 127 contracts towards the Half Throttle and Full Throttle settings, the contraction being cut-off at mid-point when the Half Throttle setting is desired by electrical circuitry to be hereinafter described. Both solenoid valves 153 and 154 are provided individual lead wires 147 for receiving energizing signals with the solenoids again having protective diodes 148 connected in parallel therewith.

Considering now the fluid circuitry for remotely selecting a desired setting of the transmission, the two previously described transmission control linkage jacks 102 and 106 are actuated through solenoid valves 158 and 157 respectively. In this example of the invention, remote controls are provided only for shifting between neutral and first speed range, although it will be apparent that the selection of any of the several speed ranges available on the loader may be provided for by substituting a more complex solenoid valve system in accordance with the principles heretofore described with reference to the control of the lift, tilt and throttle linkage jacks. Where only neutral and first speed range are desired as in the present instance, jack 102 is spring biased to the contracted or neutral setting and the solenoid valve 158 associated with the jack has an unenergized position at which the head end of the jack is communicated with return line 137 and has an energized position communicating the head end of the jack with supply line 136 to extend the jack to the first speed range setting. Solenoid valve 158 has a lead wire 147 and protective diode 148 as previously described. The second transmission control linkage jack 106 is spring biased to the contracted state which corresponds to the forward speed setting of the transmission shift linkage. The associated solenoid valve 157 has an unenergized position connecting drain line 137 to the head end of the jack and has an energized position connecting the supply line 136 therewith to extend the jack against the spring bias to the Reverse setting of the shift linkage.

Both steering linkage jacks 87, for steering or braking the loader from a remote location, are spring biased to the contracted position at which the associated steering clutches are engaged and the brakes disengaged. Accordingly each one of the jacks 87 may be controlled by a single solenoid valve, specifically, a left steering valve 159 and right steering valve 161.

Solenoid valve 159 has an unenergized position communicating fluid supply line 136 with the head end of the left steering cylinder 87 and has an energized position communicating the return line 137 therewith. Thus, de-energization of valve 159 results in extension of jack 87 to initiate turning of the loader to the left. Right steering solenoid valve 161 is similarly operative upon the head end of the right steering jack 87. As will hereinafter be described in more detail, valves 159 and 161 are energized by the same signal which energizes solenoid valve 158 of the transmission shift and thus the steering jacks 87 are contracted when the loader is in gear unless a steering signal is being received. Thus the vehicle is braked except when it is shifted into gear. Accumulator 141 and check valve 143 assure that fluid pressure is available for such braking in the event the loader engine stops.

As in the case of the other solenoid valves, valves 159 and 161 each have a lead wire 147 and are equipped with a bypass diode 148 to protect the solenoid.

Operation of the several solenoid valves described above to control the loader from a remote location may be effected by electrical circuitry illustrated in FIG. 11. A series of solid state switches 162, of which there are fifteen in this instance, each define a portion of a signal channel individual to a separate one of the different settings of the several control linkage jacks hereinbefore described. Thus a first such switch 162A defines a portion of a signal channel for the lower position of the lift control linkage jack and a second of the switches 162B defines part of a signal channel for the Float setting of the same jack. Switches 162C to 162O, respectively, define signal channels for Raise and Raise to Kick-out settings of the lift arm control linkage. Rackback, Rackback to Kick-out, and Dump settings of the bucket tilt control linkage, Half Throttle and Full Throttle settings, Reverse drive and First Gear settings of the transmission, Left Steer and Right Steer settings of the steering and braking control linkage jacks, and Engine Start and Engine Shut-off. Operation of any of the above mentioned switches 162 by a signal received from a remote location initiates control movement to the setting represented by the signal channels with which that switch is associated.

For this purpose a B+ conductor 163 connects one side of each switch 162 with the loader battery 164, the opposite or negative side of the battery being grounded. The opposite side of a majority of the switches 162 connect, directly or indirectly, with one of the hereinbefore described lead wires 147 to the several solenoid valves of the fluid circuit as will hereinafter be described in detail. Switch 162N defines the engine start signal channel and connects with the starter solenoid 167 of the loader, while switch 162O is a shut-off switch that connects with a solenoid mechanism 168, also shown in FIG. 7, which is associated with the engine governor 116 and which shuts off the fuel supply to the engine when energized. Thus closing of switch 162N by a remote signal applies battery voltage to starter solenoid 167 while closing of switch 162O by a different remote signal applies battery voltage to shut-off solenoid 168.

Considering now the means through which the control signal switches 162A to 162M apply voltage to the associated solenoid valves, with reference to FIG. 10 in conjunction with FIG. 11, the first switch 162A controlling the Lower setting of the lift arm control linkage, applies battery voltage directly to lead 147A to solenoid valve 133, when closed by an appropriate remote signal. Switch 162A simultaneously applies such voltage to lead 147B of solenoid valve 132 through a diode 169 and the emitter-collector circuit of a transistor 171. The base of transistor 171 is biased negatively by connection to ground through a resistor 172. Simultaneous energization of both solenoid valves 132 and 133 in this manner causes the jack 37 to contract towards the Lower setting thereof as previously described. However, this contraction must be interrupted once the jack reaches the Lower setting which is not an extreme position thereof. For this purpose, a normally open positioning switch 173 is connected between the base of transistor 171 and B+ conductor 163. As shown in FIG. 2, switch 173 is mounted at the rod end of the lift control linkage jack 37 and projects therefrom in a direction parallel to the axis of the jack. Switch 173 is of the reed type and is closed by the influence of a magnet 174 carried on the rod of the jack and which approaches the end of the switch 173 as the jack contracts to the point where the associated linkage is set at the Lower position. Referring now again to FIGS. 10 and 11, closing of the positioner switch 173 in the above described manner applies battery voltage to the base of transistor 171 stopping conduction therethrough and stopping further travel of the associated control linkage jack 37. Thus the end result of the closing of switch 162A by signal from a remote location is to manipulate the controls of the loader to initiate lowering of the lift arms thereof and this will continue until either the arms are fully lowered or else the control signal from the remote location ceases causing switch 162A to reopen.

Closing of switch 162B by a remote signal applies battery voltage directly to lead wire 147B and to lead wire 147A through a diode 176 thereby energizing solenoid valves 132 and 133 to realize the Float setting of the lift arm controls as previously described. Diode 176 prevents battery voltage from bypassing transistor 171 when switch 162A is closed.

Closing of switch 162C by a remote signal applies battery voltage directly to lead wire 147C to energize solenoid valve 134 thereby shifting the lift arm control linkage to the Raise setting. Closing of switch 162D by a remote signal initiates raising of the lift arms only to a predetermined dump height at which elevation of the arms is automatically stopped. Thus, switch 162D is termed the Raise to Kick-out switch. For this purpose closing of switch 162D applies battery voltage to lead wire 147C through a diode 177 and the emitter-collector circuit of a transistor 178, the base of the transistor being negatively biased by a connection to ground through a resistor 179. To stop conduction through the transistor 177 when the lift arms have reached the predetermined dump height, a normally open positioner switch 181 is connected between B+ conductor 163 and base of the transistor. As shown in FIG. 1, the positioner switch 181 is again of the reed type and is actuated by a magnetic element 182 carried on linkage 183 which is moved by extension of the lift jacks 22. The position of magnetic element 182 is fixed so that it is brought into proximity to switch 181 when the lift arms have reached the predetermined dump height, thereby closing the switch and stopping conduction through transistor 177 as previously described.

Considering now the bucket controls, with reference again to FIGS. 10 and 11 in conjunction, closing of switch 162E by a remote signal applies battery voltage directly to lead wire 147E to energize solenoid valve 151 to shift the tilt control linkage to the Rack-back setting. Closing of switch 162F also applies battery voltage to lead 147E but through a diode 184 and the emitter-collector circuit of another transistor 186 which has its base connected to ground through a resistor 187. Switch 162F thus defines the Rackback to Kick-out channel wherein the rackback motion of the bucket is prematurely terminated at the load inclination thereof. To effect this action, a normally open positioner switch 188 is connected between B+ conductor 163 and the base of transistor 186. Thus, closing of switch 188 will bias the base of the transistor to stop conduction therethrough thereby terminating the rackback motion. As shown in FIG. 1, switch 188 may be operated by cam mechanism 189 which moves with the tilt linkage 23 and depresses a cam 191 as the bucket 16 reaches the loading inclination relative to the lift arms 17. The cam mechanism 189 and 191 is part of a fluid kick-out system found on prior loaders and is described more fully in United States Patent 3,429,471. It will be apparent that the switch 188 may be situated directly beneath cam 191 or may be located elsewhere on the loader and operated by the fluid pressure signals produced by the cam mechanism in the manner described in the above mentioned patent.

Referring now again to FIGS. 10 and 11 in conjunction, closing of switch 162G by a remote signal applies battery voltage directly to lead wire 147G to energize solenoid valve 149 and thereby shift the bucket control linkage to the Dump setting.

Remotely initiated closing of switch 162H effects the Half Throttle setting by applying battery voltage to lead wire 147I directly and to lead wire 147H through a diode 192 and the emitter-collector circuit of a transistor 193 which has a base biased negatively by a ground connection through a resistor 194. By thus energizing both solenoid valves 153 and 154, contraction of the throttle control linkage jack 127 is initiated. Such contraction is terminated at the Half Throttle setting by closing of a normally open positioner switch 196 connected between B+ conductor 163 and the base of transistor 193. As shown in FIG. 7, positioner switch 196 is mounted on the throttle control linkage jack 127 and projects parallel to the rod thereof, whereby it is closed by a magnetic element 197 carried on the rod and appropriately positioned thereon to terminate contraction of jack 127 at the Half Throttle position. Closing of positioner switch 196 thus results in the de-energization of solenoid valve 153 thereby blocking the supply of hydraulic fluid to the throttle linkage jack 127.

Closing of switch 162I by a remote signal achieves the Full Throttle setting by applying battery voltage directly to lead wire 147H at the collector side of transistor 193 and simultaneously applying such voltage to lead wire 147I through a diode 198, thereby energizing both solenoid valves 153 and 154 independently of the transistor and positioner switch 196.

Closing of switch 162J by a remote signal applies battery voltage to lead wire 147J thereby energizing solenoid valve 157 to shift transmission control linkage jack 107 to the Reverse setting.

Switch 162K which is operated by a remote signal to shift the loader transmission from neutral into first gear differs from the other switches 162 in that it does not connect with the associated lead wire 147K independently of any other channels but instead acts through the left and right steering switches 162L and 162M to provide the automatic braking function hereinbefore discussed. Left and right steer switches 162L and 162M respectively also differ from the other switches 162 in two respects. Switches 162L and 162M are normally closed and do not connect directly with B+ conductor 163, but connect thereto through the above described normally open first gear switch 162K. Thus operation of either steering switch 162L or 162M will not shift the associated solenoid valve 159 or 161 to actuate the steering controls unless the loader has first been shifted into gear by closing of first gear switch 162K by an appropriate remote signal. To transmit the first gear signal to the solenoid 158 which makes the appropriate shift in the transmission linkage, the lead wire 147K to first gear solenoid 158 connects with both left and right steer signal lead wires 147L and 147M through diodes 201. The diodes 201 prevent direct transfer of current between lead wires 147L and 147M. Thus the brakes of the loader are automatically engaged when the transmission is in neutral.

Thus by operating various ones of the solid state switches 162 from a remote location, the loader may be made to perform all the normal functions thereof. While the control of the switches 162 from a distance may be accomplished by a variety of different means known to the art, such as a multi-conductor cable for example, this example of the invention utilizes radio signals for this purpose. The operator may then be situated at any desired distance from the vehicle provided that he has a direct or televised view thereof and provided that he is equipped with a portable control box or console with means for generating the signals necessary to operate appropriate ones of the switches 162.

Such an operator's control box 202 may have a series of individual manually operable switches 203 for generating the signals necessary to control the switches 162 at the loader. In this example, fifteen such manual switches 203A to 203O are provided, each being operative upon a corresponding one of the switches 162. Various radio systems capable of sensing and transmitting the condition of the several switches 203 to produce a similar condition in the corresponding switch 162 are known to the art. Such a radio system may, for example, include an encoder circuit 206 having a series of terminals 204, each of which may be grounded by closing of an associated single one of the manual switches 203. Encoder circuit 206 may be of the time multiplexing type which receives a fixed frequency signal from an oscillator 207 and modulates successive increments of such signal in accordance with the condition of each terminal 204 in a sequential manner, the modulation sequence being repeated many times each second so that there is no significant time lag in detecting a change in one of the switches 203. A transmitter 208 receives the modulated output of encoding circuit 206 and directs the signal to a receiver 209 carried on the loader. A decoding circuit 211 at the loader has a series of fifteen terminals 212, each connected to the control contact of a separate one of the loader control switches 162, and distributes voltages thereto in accordance with the modulation of the incoming radio signal so that a signal is present at each of the terminals 212 which is indicative of the momentary condition of the corresponding manual switch 203 at the operator's remote control box 202.

Referring again to FIG. 1, the radio receiver circuitry and a majority of the loader control electrical circuit elements are preferably disposed in an integral circuit box 213 carried on the loader at the operator's station 32, an antenna 214 being connected thereto. While the invention has been described with respect to a specific embodiment, it will be apparent that many modifications are possible and it is not intended to limit the invention except as defined in the following claims.

What is claimed is:

1. In combination with a powered vehicle having an element movable between a first and second position and a position intermediate therebetween, a system for moving said element in response to signals from a remote location comprising:

a motor coupled to said element for shifting said element between said positions thereof, a motor actuating circuit connected to said motor and responsive to said signals to energize said motor, said circuit having two distinct signal channels wherein a signal in either thereof may energize said motor to shift said element from said first position towards said intermediate position and said second position, and switch means connected to a single one of said channels and sensing movement of said element to said intermediate position thereof, said switch means stopping transmission of signals through said one of said channels when said element reaches said intermediate position thereof, whereby actuation of said motor through said one of said channels results in stopping of said element at said intermediate position whereas actuation of said motor through the other of said channels may shift said element between said first and second positions.

2. In combination with a powered vehicle having at least one control linkage movable between a first position and a second position and at least one intermediate position, a system for operating said vehicle from a location remote therefrom comprising:

means exerting a force on said control linkage to urge said linkage towards said first position;

a motor coupled to said control linkage for shifting said linkage from said first position towards said second position;

a motor actuating circuit coupled to said motor and having first and second signal paths wherein an input signal applied to either of said paths actuates said motor to shift said linkage from said first position towards said second position, means for selectively transmitting input signals to either of said paths from said location remote from said vehicle, and stop switch means disposed on said vehicle in a position to be operated as said control linkage reaches said intermediate position thereof, said stop switch means being coupled to said motor actuating circuit to deactuate said motor only if said motor has been actuated through a predetermined one of said pair of signal paths.

3. A system for operating a powered vehicle from a location remote therefrom wherein said vehicle has at least one control linkage movable between a first position and a second position and at least one intermediate position, comprising:

means exerting a force on said control linkage to urge said linkage towards said first position;

a motor coupled to said control linkage for shifting said linkage from said first position towards said second position;

a motor actuating circuit coupled to said motor and having first and second signal paths wherein an input signal applied to either of said paths actuates said motor and wherein a predetermined one of said pair of signal paths is defined in part by the emitter-collector circuit of a transistor, means for selectively transmitting input signals to either of said paths from said location remote from said vehicle, and stop switch means disposed on said vehicle in a position to be operated as said control linkage reaches said intermediate position thereof, said stop switch means being coupled to said motor actuating circuit to deactuate said motor only if said motor has been actuated through said predetermined one of said pair of signal paths, said stop switch being connected between the base of said transistor and a source of voltage whereby closing of said stop switch applies a voltage to said transistor to stop conduction therethrough.

4. The combination defined in claim 2 wherein said motor is a fluid operated jack coupled to said control linkage and further comprising a source of fluid under pressure, a solenoid operated valve connected between said source of fluid and said hydraulic jack, an electrical power supply, and a pair of switching means connected in parallel between said electrical power supply and said solenoid valve and each being in a separate one of said pair of signal paths of said motor actuating circuit, each of said switching means being separately operable by said input signals from said remote transmitting means.

5. The combination defined in claim 4 wherein said fluid operated jack is a component element of said control linkage of said vehicle acting as a rigid link therein when said vehicle is controlled by an operator situated thereon.

6. A system for operating a powered vehicle from a location remote therefrom wherein said vehicle is of the type having a motor driven load manipulating component shiftable between first and second positions and at least one intermediate position, wherein said vehicle is a loader and said load manipulating component thereof is the lift arms of said loader and wherein said intermediate position of said component is a predetermined dump position of said lift arms, comprising:

a motor coupled to said component for shifting said component from said first position towards the second position, a motor actuating circuit having first and second signal paths wherein an input signal on either of said paths actuates said motor, means for selectively transmitting an input signal to either of said paths from said location remote from said vehicle, and stop switch means positioned on said vehicle for operation as said component reaches said intermediate position thereof, said stop switch means being coupled to said actuating circuit for deactuating said motor only if said motor has been actuated through a predetermined one of said pair of signal paths, whereby actuating of said motor through said one of said signal paths results in stopping of said component at said intermediate position thereof whereas actuation of said motor through the other of said signal paths may shift said component to said second position thereof.

7. A system for operating a powered vehicle from a location remote therefrom wherein said vehicle is of the type having a motor driven load manipulating component shiftable between first and second positions and at least one intermediate position, wherein said vehicle is a loader and said load manipulating component thereof is the tiltable bucket of said loader and wherein said intermediate position of said component is the loading inclination of said bucket, comprising:

a motor coupled to said component for shifting said component from said first position towards the second position, a motor actuating ciricuit having first and second signal paths wherein an input signal on either of said paths actuates said motor, means for selectively transmitting an input signal to either of said paths from said location remote from said vehicle, and stop switch means positioned on said vehicle for operation as said component reaches said intermediate position thereof, said stop switch means being coupled to said actuating circuit for deactuating said motor only if said motor has been actuated through a predetermined one of said pair of signal paths, whereby actuating of said motor through said one of said signal paths results in stopping of said component at said intermediate position thereof whereas actuation of said motor through the other of said signal paths may shift said component to said second position thereof.

References Cited

UNITED STATES PATENTS

| | | | |
|---|---|---|---|
| 2,945,477 | 7/1960 | Hadekel | 91—367X |
| 3,144,723 | 8/1964 | Carter. | |
| 3,256,778 | 6/1966 | Fine | 91—361X |
| 3,386,343 | 6/1968 | Gray | 91—367X |
| 3,410,177 | 11/1968 | Roess et al. | 91—361 |
| 3,489,063 | 1/1970 | Piret | 91—361X |

ALBERT J. MAKAY, Primary Examiner

U.S. Cl. X.R.

91—367; 180—2, 77